United States Patent
Watanabe

(10) Patent No.: US 9,503,589 B1
(45) Date of Patent: Nov. 22, 2016

(54) PRINTING SYSTEM FOR DISTRIBUTING PRINT JOBS, IMAGE FORMING APPARATUS AND SERVER APPARATUS

(71) Applicants: KABUSHIKI KAISHA TOSHIBA, Tokyo (JP); TOSHIBA TEC KABUSHIKI KAISHA, Tokyo (JP)

(72) Inventor: Fumiyuki Watanabe, Tagata Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/856,763

(22) Filed: Sep. 17, 2015

(51) Int. Cl.
*G03G 15/00* (2006.01)
*H04N 1/00* (2006.01)
*H04N 1/44* (2006.01)
*G06F 3/12* (2006.01)

(52) U.S. Cl.
CPC ...... *H04N 1/00244* (2013.01); *G03G 15/5075* (2013.01); *G03G 15/5087* (2013.01); *G06F 3/1205* (2013.01); *G06F 3/1212* (2013.01); *G06F 3/1273* (2013.01); *G06F 3/1285* (2013.01); *H04N 1/00347* (2013.01); *H04N 1/4413* (2013.01); *H04N 2201/0094* (2013.01)

(58) Field of Classification Search
CPC ............ G03G 15/5075; G03G 15/5087; G03G 15/5083; G03G 2215/00109; G06F 3/126; G06F 3/1261; G06F 3/1285; H04N 1/00278
USPC ............................ 399/79, 8, 9, 38; 358/1.15
See application file for complete search history.

(56) References Cited

U.S. PATENT DOCUMENTS

| | | | | |
|---|---|---|---|---|
| 2007/0097423 A1* | 5/2007 | Kawano | ............... | G06F 3/1285 358/1.15 |
| 2010/0183321 A1* | 7/2010 | Kim | ....................... | G06F 3/126 399/38 |
| 2010/0290071 A1* | 11/2010 | Okada | ............... | G03G 15/5091 358/1.13 |
| 2011/0299120 A1* | 12/2011 | Sekine | ................. | G06F 3/1221 358/1.15 |
| 2011/0317215 A1 | 12/2011 | Ida et al. | | |
| 2012/0069394 A1* | 3/2012 | Ono | ...................... | G06F 3/1261 358/1.15 |
| 2014/0063553 A1* | 3/2014 | Bhatia | .................... | G06F 3/126 358/1.15 |

FOREIGN PATENT DOCUMENTS

JP 07-311665 A * 11/1995

OTHER PUBLICATIONS

Machine translation of JP 07-311665 A, printed on Feb. 11, 2016.*

* cited by examiner

*Primary Examiner* — Sophia S Chen
(74) *Attorney, Agent, or Firm* — Patterson & Sheridan, LLP

(57) ABSTRACT

A printing system according to an embodiment includes a server connected with at least one user device and a plurality of image forming apparatuses. A storage unit stores use history in which identification information of a user is associated with at least one of the plurality of image forming apparatuses used by the user. A control unit receives the print job from the at least one user device and identification information of a user associated with the print job. The use history corresponding to the user is retrieved based on the identification information. One of the plurality of image forming apparatuses for printing the print job is selected based on the retrieved use history. Print data corresponding to the print job is sent to the selected image forming apparatus before a job start operation input is received in the selected image forming apparatus.

20 Claims, 8 Drawing Sheets

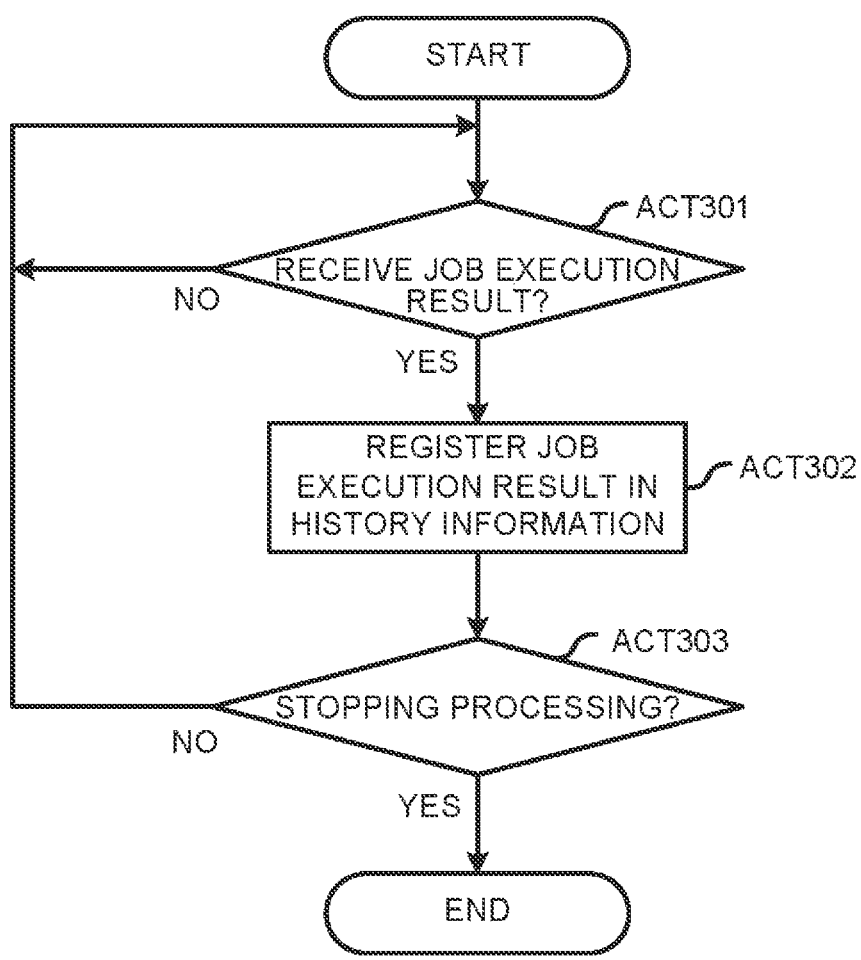

PRINTING SYSTEM FOR DISTRIBUTING PRINT JOBS, IMAGE FORMING APPARATUS AND SERVER APPARATUS

FIELD

Embodiments described herein relate generally to a technology for shortening a print start time.

BACKGROUND

A location-free printing system is known. The location-free printing refers to sending printing jobs in advance to a server, or an MFP (Multi-functional Peripheral) functioning as the server, to carry out a printing with any of the MFPs (sub-device) that are connected with the server. At this time, it is possible to carry out the printing with a desired MFP such as an MFP that is positioned closest to a user, an MFP that is not used, or the like according to settings.

In such a system, when a printing operation is carried out in the MFP selected for printing, a printing job is received from the server, the printing job is expanded and then the printing is started. In some situations, there is a problem that it takes much time to output the printing after the printing operation is started.

BRIEF DESCRIPTION OF THE DRAWINGS

FIG. 8 is a flowchart illustrating an example sequence of registration operations on the history information.

DETAILED DESCRIPTION

Figure 1:
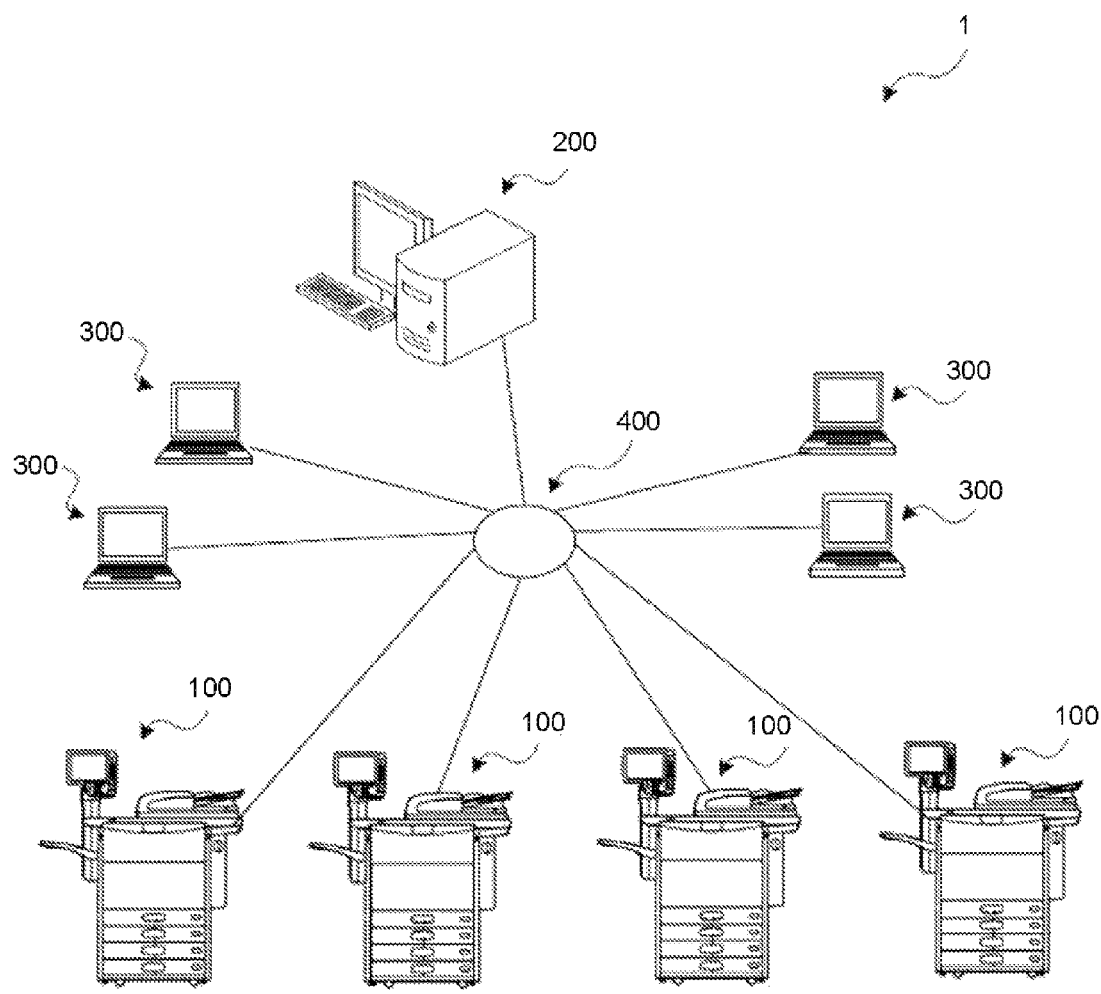
FIG. 1 is a diagram illustrating an example printing system according to an embodiment.

A printing system according to an embodiment includes a server connected with at least one user device and a plurality of image forming apparatuses. A storage unit stores use history in which identification information of a user is associated with at least one of the plurality of image forming apparatuses used by the user. A control unit receives the print job from the at least one user device and identification information of a user associated with the print job. The use history corresponding to the user is retrieved based on the identification information. One of the plurality of image forming apparatuses for printing the print job is selected based on the retrieved use history. Print data corresponding to the print job is sent to the selected image forming apparatus before a job start operation input is received in the selected image forming apparatus.

To solve the problem described above, in the system of the present embodiment, an MFP that will carry out a printing processing is estimated in advance. Further, a printing data is transmitted to the image forming apparatus in advance and the printing data is developed and decompressed in advance to shorten the time required from a moment the system is started to a moment the printing is started.

In a case in which the user carries out a printing operation without changing a printing setting with respect to the image forming apparatus serving as a transmission destination, an image that has already been developed will be printed. At this time, the printing may be quickly output after the printing operation is started.

In a case in which the user changes a printing setting to change the image forming apparatus serving as the transmission destination, it is necessary to develop the printing data again. In such a case, the printing is carried out after the printing data is developed and decompressed again.

In a case in which a printing operation is carried out by other image forming apparatus to which no printing data has been transmitted, the processing is started as before from a moment a printing job is transmitted from the server to an operated machine As a module for estimating an image forming apparatus that will carry out a printing, for example, an image forming apparatus that the user has selected to carry out printing processing in the past, an image forming apparatus which is used most often by the user, or an image forming apparatus which carries out printing processing at the latest time is stored for each user in advance and may be set as a candidate image forming apparatus. One or more image forming apparatuses may be set as a candidate image forming apparatus.

Further, in the embodiment, a state of the image forming apparatus serving as the candidate is confirmed and whether the image forming apparatus can be used immediately is also considered for changing a candidate ranking. For example, in a case in which the image forming apparatus serving as the first candidate cannot be used immediately, a machine serving as the second candidate may be selected.

By adopting such an arrangement, the time required from a moment the system is started to a moment the printing is started may be shortened in many cases.

Hereinafter, the present embodiment is described with reference to the accompanying drawings.

FIG. 1 is a diagram illustrating an example system according to the embodiment. A printing system 1 comprises a plurality of image forming apparatuses 100, a server 200 and a plurality of client devices 300, which carry out data transmission/reception with each other through a network 400.

The server 200 receives a printing job from the client device 300 used by the user, and transmits the printing job to any of the plurality of image forming apparatuses 100. The client device 300 may be a personal computer or the like. The server 200 carries out a user authentication and determines whether it can be used. The server 200 stores identification information of the user (user ID) and a password, and carries out the authentication using the data. The authentication may be carried out by another apparatus to obtain the authentication result. Moreover, the server 200 stores a history information indicating the jobs of all users and which one of the image forming apparatuses 100 executed the jobs. The server 200 also transmits the printing job to a suitable image forming apparatus 100.

The image forming apparatus 100 is an MFP having a printing function, a copy function, a FAX transmission/reception function and a scan function. The image forming apparatus 100 receives a printing job distributed by the server 200 to carry out a printing processing according to a setting value included in the printing job. The setting value of the printing job may be set and changed by the user through an operation on a touch panel of the image forming apparatus 100, for example.

The client device 300 can edit and browse a document, an image data and the like. When the user gives a printing instruction, the client device 300 converts a desired document and the like into a printing data (for example, page description language), and sends a printing job including the printing data to the server 200.

Figure 2:
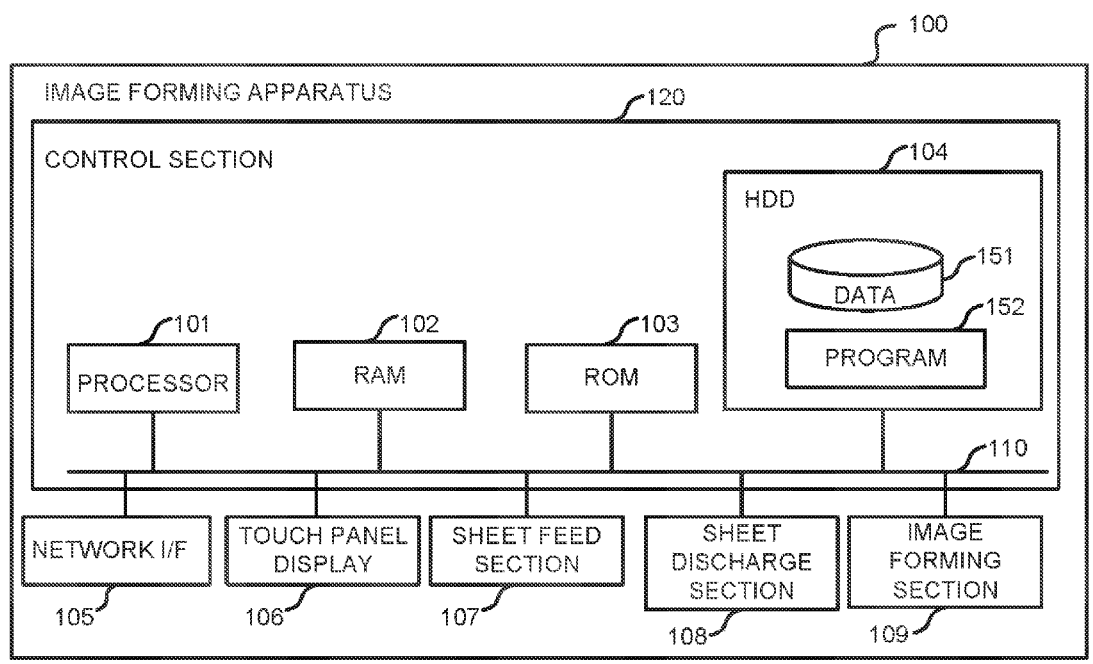
FIG. 2 is a block diagram of an example image forming apparatus.

FIG. 2 is a block diagram illustrating an example of the image forming apparatus 100. The image forming apparatus 100 includes a processor 101, a RAM (Random Access Memory) 102, a ROM (Read Only Memory) 103, an HDD (Hard Disk Drive) 104, a network I/F 105, a touch panel display 106, a sheet feed section 107, a sheet discharge section 108 and an image forming section 109, each of which carry out input/output of signals and data with each other via a bus line 110. Further, it is assumed that a control section 120 consists of the processor 101, the RAM 102, the ROM 103, the HDD 104 and the bus line 110.

The processor 101 is an arithmetic device such as a CPU (Central Processing Unit) or the like. The processor 101 provides various kinds of functions by executing programs stored in the ROM 103 and/or in the HDD 104. The programs are run by the processor 101 using the RAM 102 and cooperating with each piece of hardware. The RAM 102 is a primary storage device, and the ROM 103 is a device for storing a system program and the like in a non-volatile manner. The HDD 104 is an auxiliary storage device for storing data and programs in a non-volatile manner, and stores the program 152 and a data 151.

The network I/F 105 includes a network interface card based on a wired communication/wireless communication standard, and controls the transmission/reception of data with an external device.

The touch panel display 106 is provided with a flat-type liquid crystal screen (display section) and a touch panel (input section). The touch panel display 106 is arranged do that the touch panel is laminated on the liquid crystal screen, and is a unit capable of receiving input from directly pressing the screen with a fingertip, a nib and the like. The touch panel (input section) receives a job start operation of the user.

The sheet feed section 107 includes a tray or a cassette for stacking sheets and a pickup roller for supplying the stacked sheets to the image forming apparatus 100. The sheet discharge section 108 stacks the sheets subjected to image forming processing carried out in a main body of the image forming apparatus 100. The image forming section 109 is a unit which forms the image(s) included in printing job received from the server apparatus 200 on an original sheet arranged in an ADF (auto document feeder) or a sheet fed by the sheet feed section 107 to convey the sheet to the sheet discharge section 108.

Figure 3:
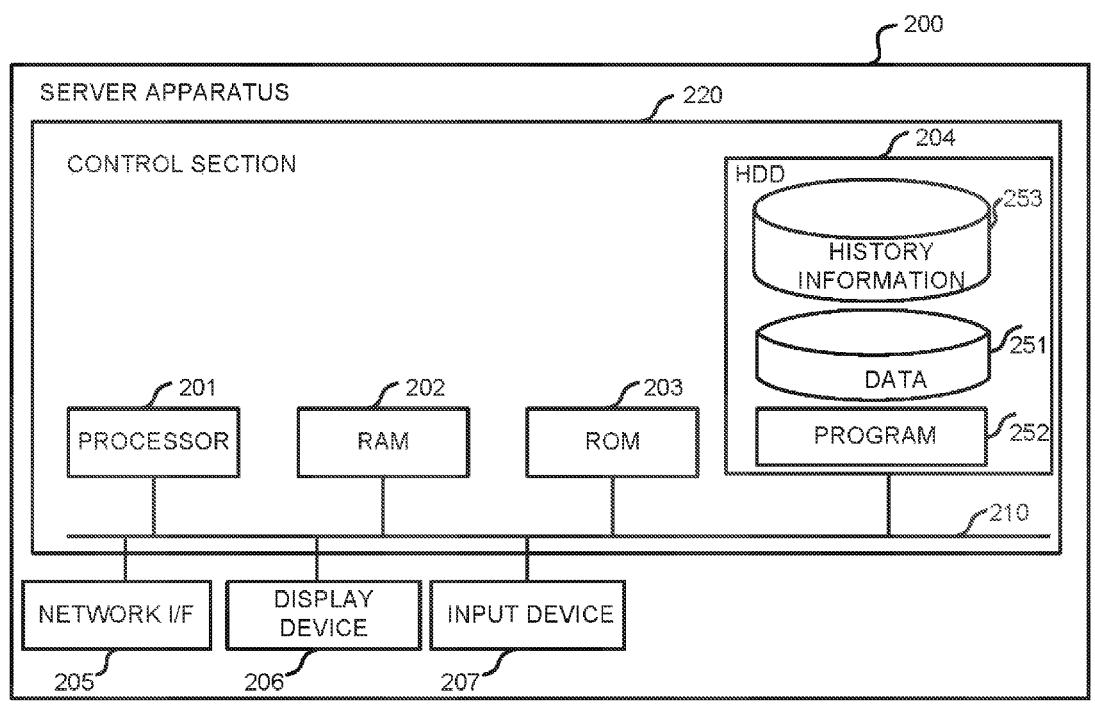
FIG. 3 is a block diagram of an example server according to the embodiment.

FIG. 3 is a block diagram illustrating an example of the server 200. The server 200 includes a processor 201, an RAM 202, an ROM 203, an HDD 204, a network I/F 205, a display device 206, and an input device 207, each of which carry out input/output of signals and data with each other via a bus line 210. It is assumed that a control section 220 consists of the processor 201, the RAM 202, the ROM 203, the HDD 204 and the bus line 210.

The processor 201, the RAM 202, the ROM 203 and the network I/F 205 are units for carrying out same operations as that of the processor 101, the RAM 102, the ROM 103 and the network I/F 105 of the image forming apparatus 100 described above, and therefore the detailed description thereof is not provided. The HDD 204 is an auxiliary storage device which stores data and programs in a nonvolatile manner, and stores a program 252 and a data 251. The HDD 204 further stores history information 253 indicating which one of the plurality of image forming apparatuses 100 were used by each user. The history information 253, which is managed and stored as a database system, can carry out registration, update and cancellation. The data can be extracted by retrieving (referring to) the history information 253. The display device 206 is a monitor, and the input device 207 is a keyboard and a mouse. The display device 206 and the input device 207 are used by the manager at the time of maintenance of the system, a failure of the apparatus and the like.

Figure 4:
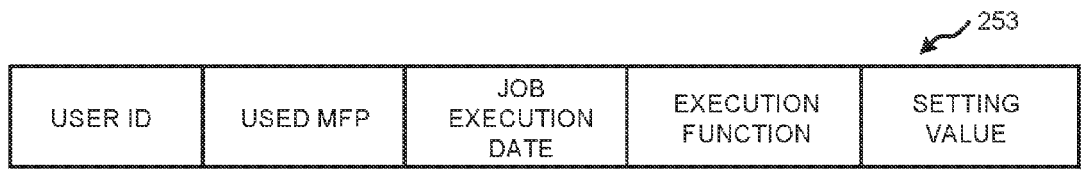
FIG. 4 illustrates an example of history information.

FIG. 4 illustrates an example of the history information 253. an example record of the history information 253 includes a user ID, a used MFP, a job execution date, an execution function and a setting value in an associated manner. The job to be registered in the history information 253 is not limited to a printing job, and it may also be a copy job, an FAX transmission job and a scan job.

The user ID is identification information of the user who input a job, and the used MFP is identification information of the image forming apparatus 100 which executed the job. The job execution date is information of date and time when the job was executed, and the execution function is a category (printing, copy, FAX transmission, and scan) of the job. The setting value refers to setting values when the job was carried out including a number of printings, a resolution, a color/monochrome, an image quality of character/photo, an allocation setting, a size of sheet, a number of pages and the like. Though the setting value in FIG. 4 is indicated by one column only, the setting value may be a plurality of columns in practice.

Figure 5:
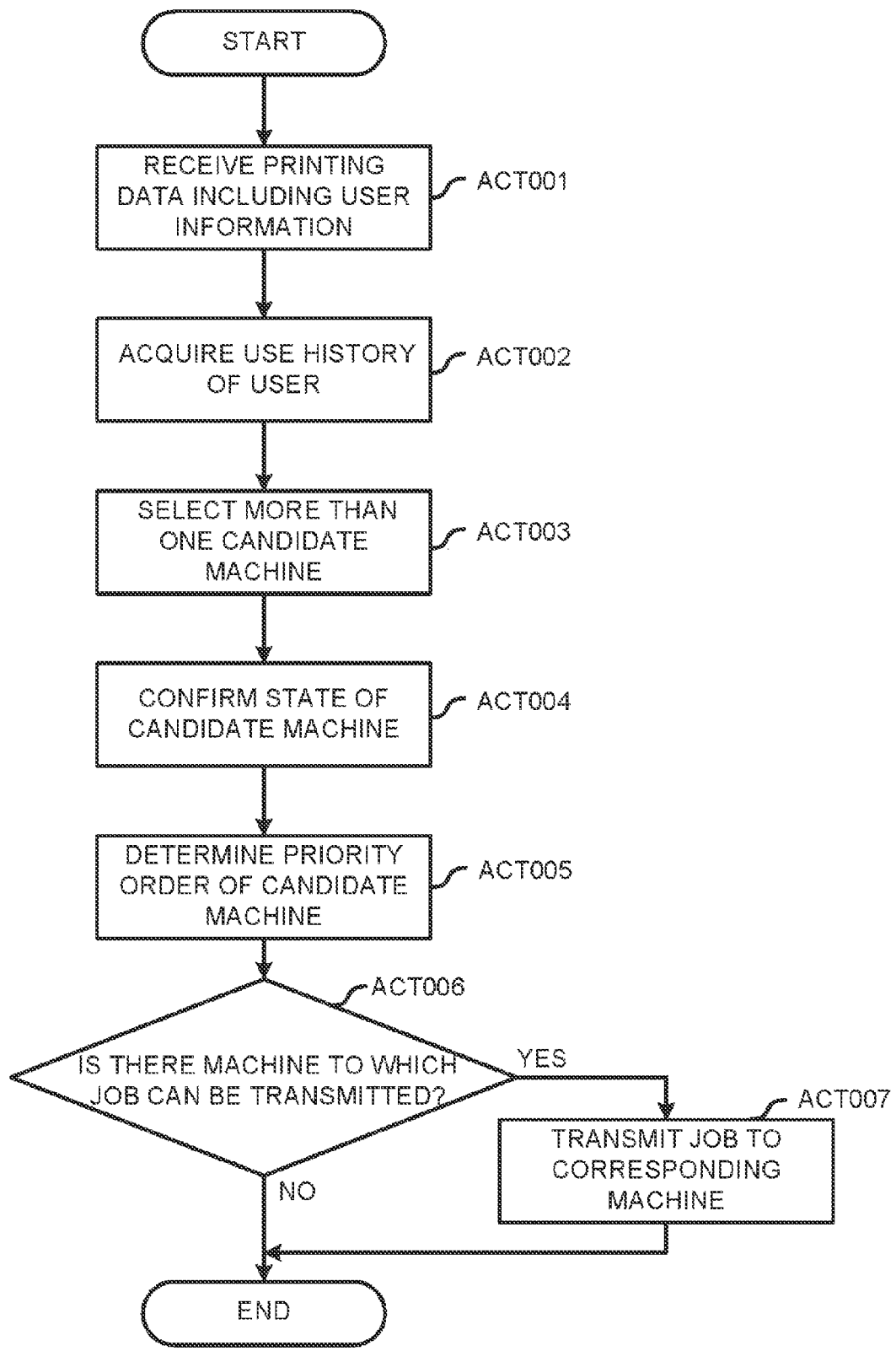
FIG. 5 is a flowchart illustrating an example sequence of operations of the server.

FIG. 5 is a flowchart illustrating an example sequence of operations of the server 200. Each operation in FIG. 5 is realized by executing the program 252 by the processor 201 and cooperating with each piece of hardware.

The processor 201 activates the network I/F 205 to receive a printing data including user information (user ID) (ACT 001). The printing job to be received at this time contains a printing data in a page description language (PDL), for example. Further, at the time of printing, the printing job is developed, decompressed and printed as image data according to setting values such as a resolution, a category of color/monochrome and the like described in the page description language.

The processor 201 acquires a record (use history) consistent with the user ID from the history information 253 (ACT 002). The processor 201 selects one or more than one image forming apparatus 100 serving as a candidate based on the acquired record (ACT 003). Selection of the candidate is, for example, based on one or more conditions as follows:

(Condition 1) an image forming apparatus of which the number of times used is the most within the latest n times (for example, 10);

(Condition 2) an image forming apparatus that was most recently used;

(Condition 3) an image forming apparatus of which the number of times used is the most within the latest n days (for example, 10 days); and (Condition 4) an image forming apparatus of which the number of times used is the most from the moment the system is started to be operated.

That is, the processor 201 selects an image forming apparatus having the number of times being used to execute jobs, with reference to the use history. In addition to the conditions described above, for example, the candidate may be selected as a machine of which the number of times used is the most with respect to color printing, a machine of which the number of times used is the most with respect to a number of printings and/or a number of pages, and the like, according to setting values contained in the job. The processor 201 selects the image forming apparatuses 100 respectively consistent with the each of the conditions 1-4 in ACT 003. Thus, in ACT 003, not only one image forming apparatus 100 but also a plurality of image forming apparatuses 100 may also be selected.

The processor 201 activates the network I/F 205 to carry out a polling (ACT 004) to confirm a state of the selected image forming apparatus 100. As one example of the polling, a confirmation on whether the image forming apparatus 100 is started according to a Ping command and an SNMP-based request in a case in which an SNMP agent is introduced to the image forming apparatus 100 are transmitted. Further, other monitoring mechanism may be used other than this example. At this time, the processor 201 confirms whether a defect has occurred in the image forming apparatus 100 including, such as: a paper jam occurs, there is no sheet of designated size, the power is cut off, or the like. The processor 201 may exclude the machine in which a defect has occurred from the candidates.

The processor 201 sets a priority order for one or more than one image forming apparatus 100 serving as the candidate (ACT 005). As one example, there is such an implementation as follows. For example, weight coefficients 4, 3, 2 and 1 are respectively arranged for conditions 1, 2, 3 and 4. According to the example, the processor 201 performs a numeric correction in such a manner that a machine consistent with the condition 1 is the machine 4, a machine consistent with the condition 2 is the machine 3, a machine consistent with the condition 3 is the machine 2 and a machine consistent with the condition 4 is the machine 1. The processor 201 sorts the image forming apparatuses 100 serving as the candidate in the descending order of corrected numeral, and sets the priority order. Further, in a case in which the image forming apparatus 100 in which a defect has occurred is one of the candidates in ACT 004, the processor 201 may set a priority order for the machine in which an aforementioned defect has occurred by using a value obtained by integrating a specific numeral such as 0.3 with the corrected numeral.

The processor 201 determines whether there is an image forming apparatus 100 to which a printing job can be transmitted (ACT 006). In a case in which an excluding processing in ACT 004 is carried out, there may be no image forming apparatus 100 to which a job can be transmitted. Thus, the processor 201 determines herein whether there is an image forming apparatus to which a job can be sent. In a case in which there is a machine to which a job can be transmitted (YES in ACT 006), a job is transmitted to the corresponding image forming apparatus 100 (ACT 007). In a case in which the image forming apparatus 100 having a highest priority order is operated, the processor 201 activates the network I/F 205 to send the printing data to the machine. In a case in which the image forming apparatus 100 having the highest priority order is not operated, the processor 201 sends the printing data to a machine having a priority order ranked second. In this way, the processor 201 sends the printing data to the image forming apparatus 100 having the highest priority order among the image forming apparatuses 100 in which no defect occurs. Further, in ACT 007, the processor 201 activates the network I/F 205 to carry out transmission of printing data after sending a transmission request telegram of printing data first.

In a case in which there is no image forming apparatus 100 to which a job can be transmitted (NO in ACT 006), the present processing is terminated without carrying out the transmission processing. Further, in a case of not carrying out the transmission processing, the operations as before are to be carried out. In a case in which there is a transmission requesting a job from any one of the plurality of image forming apparatuses 100, the job is to be sent to the corresponding image forming apparatus 100.

Figure 6:
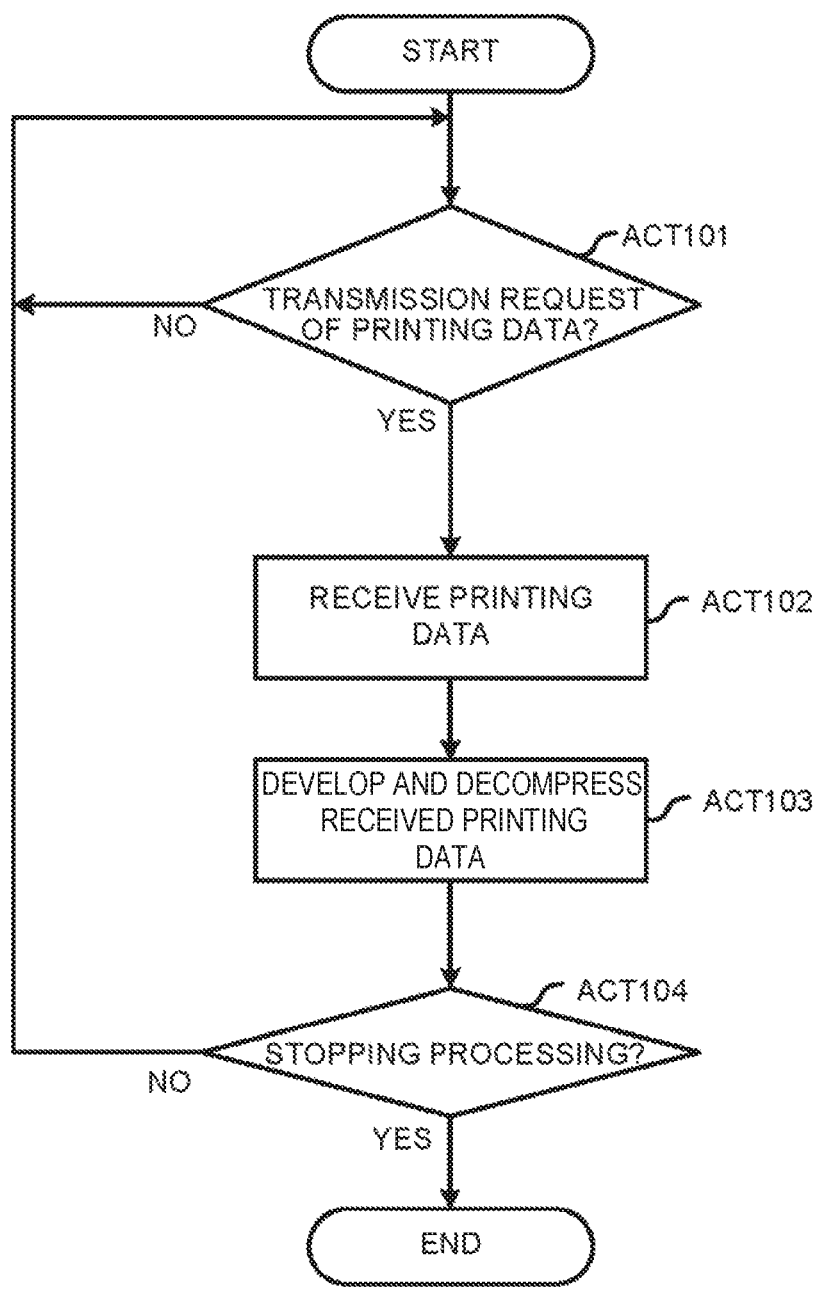
FIG. 6 is a flowchart illustrating an example sequence of operations of the image forming apparatus.
Figure 7:
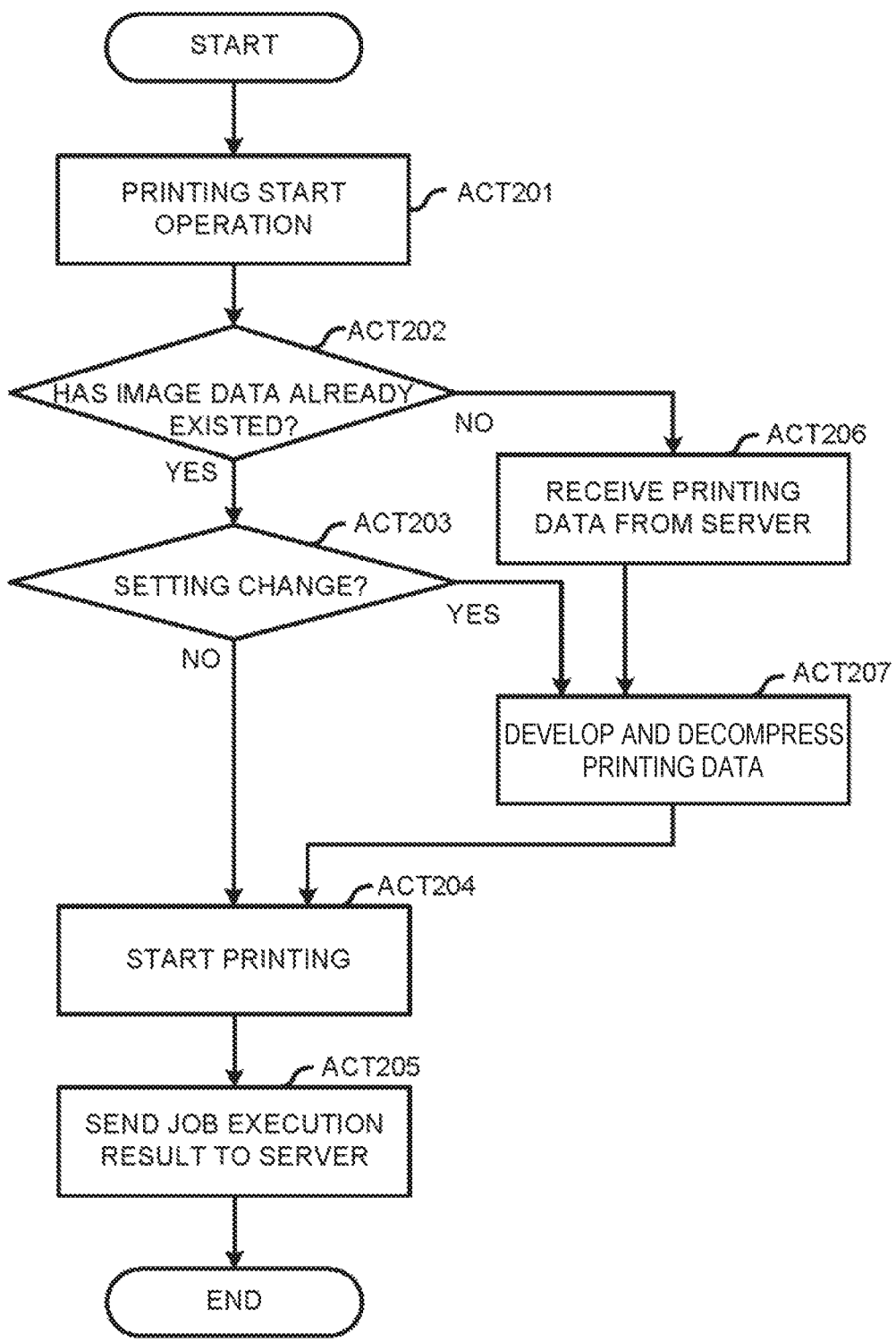
FIG. 7 is a flowchart illustrating another example sequence of operations of the image forming apparatus.

FIG. 6 and FIG. 7 are flowcharts illustrating example sequences of operations of the image forming apparatus 100. Each operation in FIG. 6 and FIG. 7 is realized by executing the program 152 by the processor 101 and cooperating with each piece of hardware.

First, FIG. 6 is described. FIG. 6 is a flowchart illustrating an example sequence of operations when the printing data in ACT 007 shown in FIG. 5 is received.

The processor 101 waits until the network I/F 105 receives a transmission request of the printing data from the server apparatus 200 (loop of NO in ACT 101). When receiving the transmission request, the processor 101 controls the network I/F 105 to carry out the reception of the printing data (ACT 102). After the reception is completed, the processor 101 develops and decompresses the received job (ACT 103). The developing and decompressing mentioned herein is an operation converting the printing data (PDL data) into image data, and in the present example, it is assumed to be a series of operations of extracting a PDL data relating to image formation from the printing job and converting the PDL data into an image data.

The processing in ACT 101 through ACT 103 is repeatedly executed (loop of NO in ACT 104) until stopping processing (for example, power is cut off) of the image forming apparatus 100 is carried out.

Next, FIG. 7 is described. FIG. 7 is a flowchart illustrating an example sequence of operations when the user instructs the image forming apparatus 100 to execute a printing start.

The processor 101 receives a printing start operation from the user (ACT 201). Herein, the processor 101 executes the following processing.

The processor 101 performs the user authentication through cooperation with the server 200.

In a case in which the authentication conforms, the processor 101 displays a list of jobs inputted by the user to receive a selection on whether to execute any one of the jobs.

In a case in which there is a request from the user, the processor 101 resets the setting values of the jobs.

The processor 101 executes the job upon the pressing of a start button by the user.

Further, for the printing start operation (job start operation), only the pressing of start button is an essential operation, and the user authentication, the display of list, and the reset of setting values are additional operations.

The processor 101 determines whether the image data developed and decompressed already exists on the image forming apparatus, that is, whether the image data has already been developed and decompressed before executing the processing in ACT 201 (ACT 202). The image data mentioned herein refers to the image data developed and decompressed in ACT 103 in FIG. 6.

In a case in which there is the image data (YES in ACT 202), the processor 101 determines whether there is a setting change necessitating developing the image data again as described above (ACT 203). The setting necessitating developing the image data again refers to, for example, a setting for changing an image quality such as changing a resolution, changing a mode of photograph/character and the like, and a setting for changing color tone such as changing a category of color/monochrome and the like.

In a case in which there is no setting change necessitating developing the image data again (NO in ACT 203), the processor 101 controls the image forming section 109 to print the corresponding image data (ACT 204). Then, the processor 101 activates the network I/F 105 to transmit a job execution result (ACT 205). The job execution result which is transmitted to the server 200 is information indicating whether the job is completed or an error occurs, and information including a category of job functions executed in practice, a setting value, an ID of a user who inputs the job, a job execution date and time.

Returning to the description of the determination in ACT 202, in a case in which there is no developed and decompressed image data (NO in ACT 202), the processor 101 activates the network I/F 105 to transmit a job request to the server 200 and receive a corresponding job (ACT 206). The processor 101 develops and decompresses the received job (ACT 207) according to a setting value contained in the received job, and proceeds to the processing in ACT 204.

Further, on the other hand, in a case in which a setting change necessitating developing the image data again, as described above, is carried out (YES in ACT 203), the processor 101 develops and decompresses the image data for the job again (ACT 207) according to the reset setting value, and then proceeds to the processing in ACT 204.

FIG. 8 is a flowchart illustrating an example sequence of operations of the server 200 when receiving a job execution result. The processor 201 waits for until the network I/F 205 receives an execution result (loop of NO in ACT 301). If the network I/F 205 receives a job execution result (YES in ACT 301), the processor 201 registers identification information of the image forming apparatus 100 serving as a transmitting source, and information of a category of job function contained in the job execution result, a setting value, an ID of a user who inputs the job, a job execution date and time in the history information 253 (ACT 302). The processing in ACT 301 and ACT 302 is executed repeatedly until a stopping processing (for example, the power is cut off) of the server apparatus 200 is carried out (loop of NO in ACT 303).

In the description stated above, the server 200 for management is arranged to carry out the distribution of jobs. However, the present invention is not limited to this, and the image forming apparatus 100 may be provided with the aforementioned functions of the server 200. In this case, one of the plurality of image forming apparatuses 100 serves as a server. Further, the functions of the aforementioned server may be distributed by storing and managing the history information in advance in the plurality of image forming apparatuses and carrying out data exchange of the history information stored and managed by the image forming apparatuses with each other.

Further, in the description stated above, it is assumed that there is a plurality of image forming apparatuses, however, there may only be one image forming apparatus. In addition, there may be a plurality of servers.

It is exemplified in the example described above that the server transmits the job to the selected one image forming apparatus, However, the server may select a plurality of image forming apparatuses and transmit the job to all selected image forming apparatuses. As one example in this case, the processor 201 transmits the job to all image forming apparatuses that are respectively consistent with each of the aforementioned conditions 1-4.

In the embodiments described above, any of the processes described above can be accomplished by a computer-executable program, and this program can be embodied in a non-transitory computer-readable memory device. In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above. Furthermore, based on an instruction in the installed program, an OS (operating system) of the computer, or MW (middleware software), such as database management software or network, may execute one or more parts of the processes described above to realize the embodiments.

In accordance with the present embodiment, it is possible to shorten the time required from a moment the user carries out a printing operation to a moment the printing is outputted.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A server for a printing system in which the server is connected with at least one user device and a plurality of image forming apparatuses, the server comprising:
    a storage unit configured to store use history in which identification information of a user is associated with at least one of the plurality of image forming apparatuses used by the user; and
    a control unit configured to:
        receive a print job from the at least one user device and identification information of a user associated with the print job,
        retrieve, from the storage unit, the use history corresponding to the user associated with the print job based on the identification information,
        select one of the plurality of image forming apparatuses for printing the print job based on the retrieved use history, and
        send print data corresponding to the print job to the selected image forming apparatus for printing the print job before a job start operation input instructing a start of printing of the print job is received in the selected image forming apparatus.

2. The server according to claim 1, wherein:
    the control unit is further configured to, based on the retrieved use history, determine for each of the plurality of image forming apparatuses a number of times print jobs associated with the user were executed in the image forming apparatus, and
    the control unit selects one of the plurality of image forming apparatuses for which the number of times is the greatest.

3. The server according to claim 2, wherein
    the retrieved use history further includes, for each of the print jobs associated with the user, a date information indicating a date on which the print job was executed, and the control unit selects one of the plurality of image forming apparatuses for which the number of times in a predetermined number of most recent print jobs is the greatest.

4. The server according to claim 2, wherein
the retrieved use history further includes, for each of the print jobs associated with the user, a date information indicating a date on which the print job was executed, and
the control unit selects, based on the date information for each of the print jobs associated with the user, one of the plurality of image forming apparatuses for which the number of times is the greatest within a predetermined time period.

5. The server according to claim 1, wherein
the retrieved use history further includes, for each of the print jobs associated with the user, a date information indicating a date on which the print job was executed, and
the control unit selects, based on the date information for each of the print jobs associated with the user, one of the plurality of image forming apparatuses that most recently executed a print job associated with the user.

6. The server according to claim 1, wherein
the control unit is further configured to determine whether any one of the plurality of the image forming apparatuses is in a failure state, and
if any one of the plurality of image forming apparatuses is determined to be in the failure state, the control unit does not select, for printing the print job, the image forming apparatus determined to be in the failure state.

7. The server according to claim 1, wherein
the control unit is further configured to:
receive an execution result from the image forming apparatus that executes the print job, the execution result including the identification information of the user associated with the print job, and
control the storage unit to store a new use history including the execution result.

8. A method for controlling a printing system in which a server is connected with at least one user device and a plurality of image forming apparatuses, the method comprising the steps of:
storing, in a storage unit, a use history in which the identification information of a user is associated with at least one of the plurality of image forming apparatuses used by the user;
receiving a print job from the at least one user device;
receiving identification information of a user associated with the print job;
retrieving from the storage unit the use history corresponding to the user associated with the print job based on the identification information;
selecting one of the plurality of image forming apparatuses for printing the print job based on the retrieved use history; and
sending print data corresponding to the print job to the selected image forming apparatus for printing the print job before a job start operation input instructing a start of printing of the print job is received in the selected image forming apparatus.

9. The method according to claim 8, further comprising the step of:
determining, for each of the plurality of image forming apparatuses, a number of times print jobs associated with the user were executed in the image forming apparatus based on the retrieved use history, wherein one of the plurality of image forming apparatuses for which the number of times is the greatest is selected for printing the print job.

10. The method according to claim 9, wherein
the retrieved use history further includes, for each of the print jobs associated with the user, a date information indicating a date on which the print job was executed, and
one of the plurality of image forming apparatuses for which the number of times in a predetermined number of most recent print jobs is the greatest is selected for printing the print job.

11. The method according to claim 9, wherein
the retrieved use history further includes, for each of the print jobs associated with the user, a date information indicating a date on which the print job was executed, and
based on the date information for each of the print jobs associated with the user, one of the plurality of image forming apparatuses for which the number of times is the greatest within a predetermined time period is selected for printing the print job.

12. The method according to claim 8, wherein
the retrieved use history further includes, for each of the print jobs associated with the user, a date information indicating a date on which the print job was executed, and
based on the date information for each of the print jobs associated with the user, one of the plurality of image forming apparatuses that most recently executed a print job associated with the user is selected for printing the print job.

13. The method according to claim 8, further comprising the step of:
determining whether any one of the plurality of the image forming apparatuses is in a failure state, wherein
if any one of the plurality of image forming apparatuses is determined to be in the failure state, the image forming apparatus determined to be in the failure state is not selected for printing the print job.

14. The method according to claim 8, further comprising the steps of:
receiving an execution result from the image forming apparatus that executes the print job, the execution result including the identification information of the user associated with the print job; and
control the storage unit to store a new use history including the execution result.

15. A non-transitory computer readable medium containing instructions for controlling a printing system in which a server having a storage unit is connected with at least one user device and a plurality of image forming apparatuses, the instructions causing the server to perform the steps of:
storing, in the storage unit, a use history in which the identification information of a user is associated with at least one of the plurality of image forming apparatuses used by the user;
receiving a print job from the at least one user device;
receiving identification information of a user associated with the print job;
retrieving from the storage unit the use history corresponding to the user associated with the print job based on the identification information;
selecting one of the plurality of image forming apparatuses for printing the print job based on the retrieved use history; and sending print data corresponding to the print job to the selected image forming apparatus for printing the print job before a job start operation input instructing a start of printing of the print job is received in the selected image forming apparatus.

16. The non-transitory computer readable medium according to claim 15, the instructions further causing the server to perform the step of:

determining, for each of the plurality of image forming apparatuses, a number of times print jobs associated with the user were executed in the image forming apparatus based on the retrieved use history, wherein one of the plurality of image forming apparatuses for which the number of times is the greatest is selected for printing the print job.

17. The non-transitory computer readable medium according to claim 16, wherein the retrieved use history further includes, for each of the print jobs associated with the user, a date information indicating a date on which the print job was executed, and one of the plurality of image forming apparatuses for which the number of times in a predetermined number of most recent print jobs is the greatest is selected for printing the print job.

18. The non-transitory computer readable medium according to claim 16, wherein the retrieved use history further includes, for each of the print jobs associated with the user, a date information indicating a date on which the print job was executed, and based on the date information for each of the print jobs associated with the user, one of the plurality of image forming apparatuses for which the number of times is the greatest within a predetermined time period is selected for printing the print job.

19. The non-transitory computer readable medium according to claim 15, wherein the retrieved use history further includes, for each of the print jobs associated with the user, a date information indicating a date on which the print job was executed, and based on the date information for each of the print jobs associated with the user, one of the plurality of image forming apparatuses that most recently executed a print job associated with the user is selected for printing the print job.

20. The non-transitory computer readable medium according to claim 15, the instructions further causing the server to perform the step of:

determining whether any one of the plurality of the image forming apparatuses is in a failure state, wherein if any one of the plurality of image forming apparatuses is determined to be in the failure state, the image forming apparatus determined to be in the failure state is not selected for printing the print job.

* * * * *